United States Patent [19]

Higaki et al.

[11] Patent Number: 5,045,989

[45] Date of Patent: Sep. 3, 1991

[54] PWM POWER SUPPLY ELIMINATING MODULATION-FREQUENCY COMPONENTS FROM GROUND POTENTIALS

[75] Inventors: Shigetoshi Higaki, Tokyo; Hata, Kawasaki, both of Japan

[73] Assignee: Kabushiki Kaisha Toshiba, Kawasaki, Japan

[21] Appl. No.: 403,467

[22] Filed: Sep. 6, 1989

[30] Foreign Application Priority Data

Sep. 6, 1988 [JP] Japan .................. 63-221255
Jan. 27, 1989 [JP] Japan .................. 1-16174

[51] Int. Cl.[5] .............................. H02M 5/45
[52] U.S. Cl. ........................ 363/37; 363/97; 363/124; 363/134; 363/41
[58] Field of Search ......... 363/34, 37, 40, 41, 363/80, 97, 98, 124, 132, 134

[56] References Cited

U.S. PATENT DOCUMENTS

| | | | |
|---|---|---|---|
| 3,286,155 | 11/1966 | Corey | 363/41 |
| 4,162,525 | 7/1979 | Epp | 363/41 |
| 4,244,016 | 1/1981 | Mitchell | 363/98 |
| 4,443,841 | 4/1984 | Mikami et al. | 363/132 |
| 4,502,105 | 2/1985 | Jessee | 363/98 |
| 4,519,022 | 5/1985 | Glennon | 363/132 |
| 4,564,895 | 1/1986 | Glennon | 363/132 |
| 4,641,330 | 2/1987 | Herwig et al. | 363/41 |
| 4,672,521 | 6/1987 | Riesco | 363/134 |
| 4,706,180 | 11/1987 | Wills | 363/98 |
| 4,739,465 | 4/1988 | Asano et al. | 363/97 |
| 4,823,247 | 4/1989 | Tamoto | 363/124 |

FOREIGN PATENT DOCUMENTS 0159000 10/1985 European Pat. Off. .

OTHER PUBLICATIONS

Rajagopalan, Dec. 1987 18th Annual IEEE Power Electronics Specialist Conference, "Analysis and Design Of A Oval Series Resonant Converter For Utility Interface".

Primary Examiner—William H. Beha, Jr.
Assistant Examiner—Jeffrey Sterrett
Attorney, Agent, or Firm—Foley & Lardner

[57] ABSTRACT

In a PWM control type power supply apparatus, a modulation (high frequency) signal component is eliminated from an AC output. The PWM control type power supply apparatus includes: AC-to-DC converting means coupled to an AC (alternating current) power source capable of supplying a first AC voltage having a low frequency from a pair of output terminals, for converting the first AC voltage to obtain a positive DC (direct current) voltage from a positive half cycle of the first AC voltage appearing at one output terminal and a negative DC voltage from a negative half cycle of the first AC voltage appearing at one output terminal with a common voltage appearing at the other output terminal; and, DC-to-AC inverter means including a pair of first and second switching elements, and a PWM (pulse width modulation) controller for controlling switching operations of the first and second switching elements in a PWM control mode so as to invert the positive and negative DC voltage into a second AC voltage having a modulation frequency higher than the low frequency with respect to the common voltage output terminal, whereby the second AC voltage contains no modulation frequency component.

14 Claims, 12 Drawing Sheets

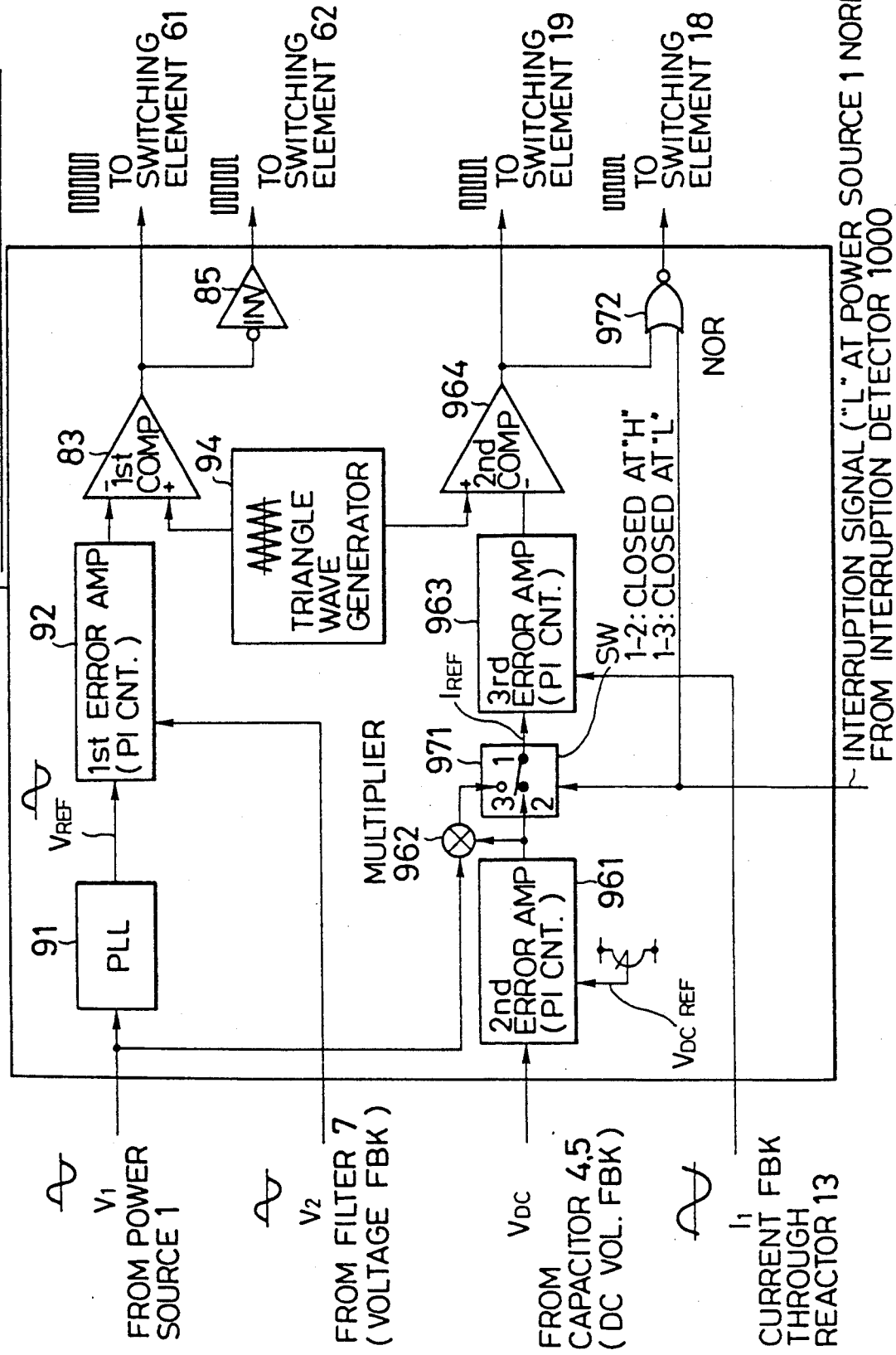

PWM POWER SUPPLY ELIMINATING MODULATION-FREQUENCY COMPONENTS FROM GROUND POTENTIALS

BACKGROUND OF THE INVENTION

1. Field of the Invention

The present invention generally relates to a frequency power supply apparatus under control of pulse-width modulation. More specifically, the present invention is directed to a PWM (pulse-width modulation)-control type power source whose ground potential has no high-frequency (modulation frequency) signal components.

2. Description of the Related Art

In FIG. 1, there is shown a major circuit of a typical PWM controlled power supply apparatus.

A circuit arrangement of this power supply apparatus is as follows: A voltage of a single-phase AC power supply source 501, one line of which is grounded, is rectified in a full waveform rectifying mode by a bridge rectifier 502 constructed of diodes 521 to 524. The rectified voltage is converted into a predetermined DC voltage via a step-up chopper 507 constructed of a DC reactor 571, a switching element 572, and a diode 573, and a smoothing capacitor 503. Thereafter, the resultant DC voltage is again converted into a corresponding AC voltage by way of pulse-width-modulation (PWM) controlling operations by an inverter circuit 504 arranged by a bridge-construction of switching elements 541 to 544. The resultant AC voltage is filtered by an L-type filter 505 including a reactor 51 and a capacitor 552 so as to eliminate high-frequency (modulation) signal components and converted into a smoothed sinusoidal wave. Finally, this sinusoidal wave voltage is applied to a load 506.

The function of the step-up chopper 507 is to increase the input voltage in order that the output AC voltage is equal to the power source voltage. Alternatively, the input AC voltage may be stepped up by, for instance, a transformer and thereafter may be rectified.

In fact, according to the above-described conventional power supply apparatus, the high-frequency (modulation) signal components have been eliminated from the AC voltage applied to the load. However, the high-frequency signal components appear in the ground potentials due to an employment of the PWM control operations.

Referring now to waveforms shown in FIG. 2, a description will be made why the high-frequency (modulation) signal components are contained in the ground potentials.

Assuming that a supply voltage (a voltage across L-N terminals) is equal to "$V_1$", a ground potential "$v_N$" at a ground side "N" of the power source 501 is equal to zero ("$v_N$"=0), whereas another ground potential "$v_L$" at a non-ground side "L" thereof is equal to "$V_1$" ($v_L = V_1$) (see FIG. 2A). A ground potential "$v_{DN}$" at a load side "DN" of a DC output from the rectifier 502 is determined by conduction of the diodes 522 and 524. That is, during the positive period of the power source voltage $V_1$, the ground potential $v_{DN}$ is equal to zero ($v_{DN}=0$) since one diode 24 is turned ON. During the negative period of the power source voltage $V_1$, the ground potential $v_{DN}$ is equal to $V_1$ ($v_{DN}=V_1$). As a result, if the DC voltage is "$E_o$", another potential voltage $v_{DP}$ at the positive side "DP" is determined by:

$$v_{DP} = v_{DN} + E_o,$$

where $E_o$ is nearly equal to a constant (see FIG. 2B).

A ground potential "$v_V$" at an AC output "V" phase of the inverter circuit 504 is determined by turning ON/OFF the switching elements 543 and 544. When one switching element 543 is turned ON, the ground potential $V_v$ is equal to $v_{DP}$ ($v_V = v_{DP}$), whereas when the other switching element 44 is turned ON, the ground potential $v_V$ is equal to $v_{DN}$ ($v_V = v_{DN}$). In general, all of these switching elements are turned ON/OFF at a high speed (e.g., 10 to 20 KHz) under PWM control so that the ground potential of the V phase "$v_V$" contains the high-frequency signal (noise) components as "$v_{DP}$" and "$v_{DN}$" being envelope lines because of the PWM control operation (see FIG. 2C).

Another ground potential "$v_U$" at an U phase of the AC output is determined by the following equation, if the AC output voltage is equal to "$V_o$":

$$v_U = v_V + V_o.$$

As a consequence, in the case when the AC output voltage $V_o$ is equal to the power source voltage $V_1$ and also has a in-phase condition thereto, the ground potential "$v_U$" is represented by a waveform shown in FIG. 2D. This ground potential "$v_U$" contains the high-frequency signal components similar to the above-described ground potential "$v_V$". A maximum value "$v_U(max)$" of this ground potential "$v_U$" is defined by:

$$v_U(max) = \text{a peak value of } V_o + E_o.$$

It is obvious that this maximum value "$v_U(max)$" is considerably higher than the AC output voltage $V_o$ from the inverter 504.

In the case when the AC output voltage $V_o$ is equal to the power source voltage $V_1$ and also has a reverse-phase condition thereto, the ground potential "$v_U$" is represented by a waveform shown in FIG. 2E. This ground potential "$v_V$" also contains the high-frequency signal components.

While there has been described above, a system according to the conventional PWM controlled power supply apparatus, since the variations in the ground potentials at the output terminal thereof contain the high-frequency signal (noise) components produced by the high speed switching operation of the DC/AC inverter, it is necessary to employ a large-scale line filter so as to filter out such high-frequency (modulation) noise components. In particular, as a power supply apparatus used for computers, the high-frequency noises must be completely eliminated. Also, in the case when a surge suppressor capable of absorbing indirect lightings or switching surges is provided between the line and ground, this surge suppressor may be burned out. Specifically, since the very high voltage is instantaneously applied, the rated voltage of the surge suppressor must be selected to be a proper high value.

SUMMARY OF THE INVENTION

The present invention has been made in the attempt to solve the above-described drawbacks of the conventional PWM-controlled power supply apparatus, and therefore has an object in providing a PWM-controlled power supply apparatus containing no high-frequency (modulation) signal component produced by the pulse-width modulation switching operation in the ground potentials at the output terminal thereof, and having a suppressed maximum voltage.

A power supply apparatus according to the invention, comprises:

AC-to-DC converting means (2:3) coupled to an AC (alternating current) power source (1) capable of supplying a first AC voltage ($V_1$) having a low frequency from a pair of output terminals (L:N), for converting the first AC voltage ($V_1$) to obtain a positive DC (direct current) voltage ($E_1$) from a positive half cycle of the first AC voltage appearing at one output terminal (L) and a negative DC voltage ($E_2$) from a negative half cycle of the first AC voltage appearing at one output terminal (L) with a common voltage appearing at the other output terminal (N); and, DC-to-AC inverter means (60) including a pair of first and second switching elements (61:62), and a PWM (pulse width modulation) controller (9) for controlling switching operations of the first and second switching elements (61:62) in a PWM control mode so as to invert the positive and negative DC voltage ($E_1:E_2$) into a second AC voltage ($V_2$) having a modulation frequency higher than the low frequency with respect to the common voltage output terminal (N), whereby the second AC voltage ($V_2$) contains no modulation frequency component.

BRIEF DESCRIPTION OF THE DRAWINGS

For a better understanding of the present invention, reference is made to the following descriptions in conjunction with the accompanying drawings, in which.

Figure 7:
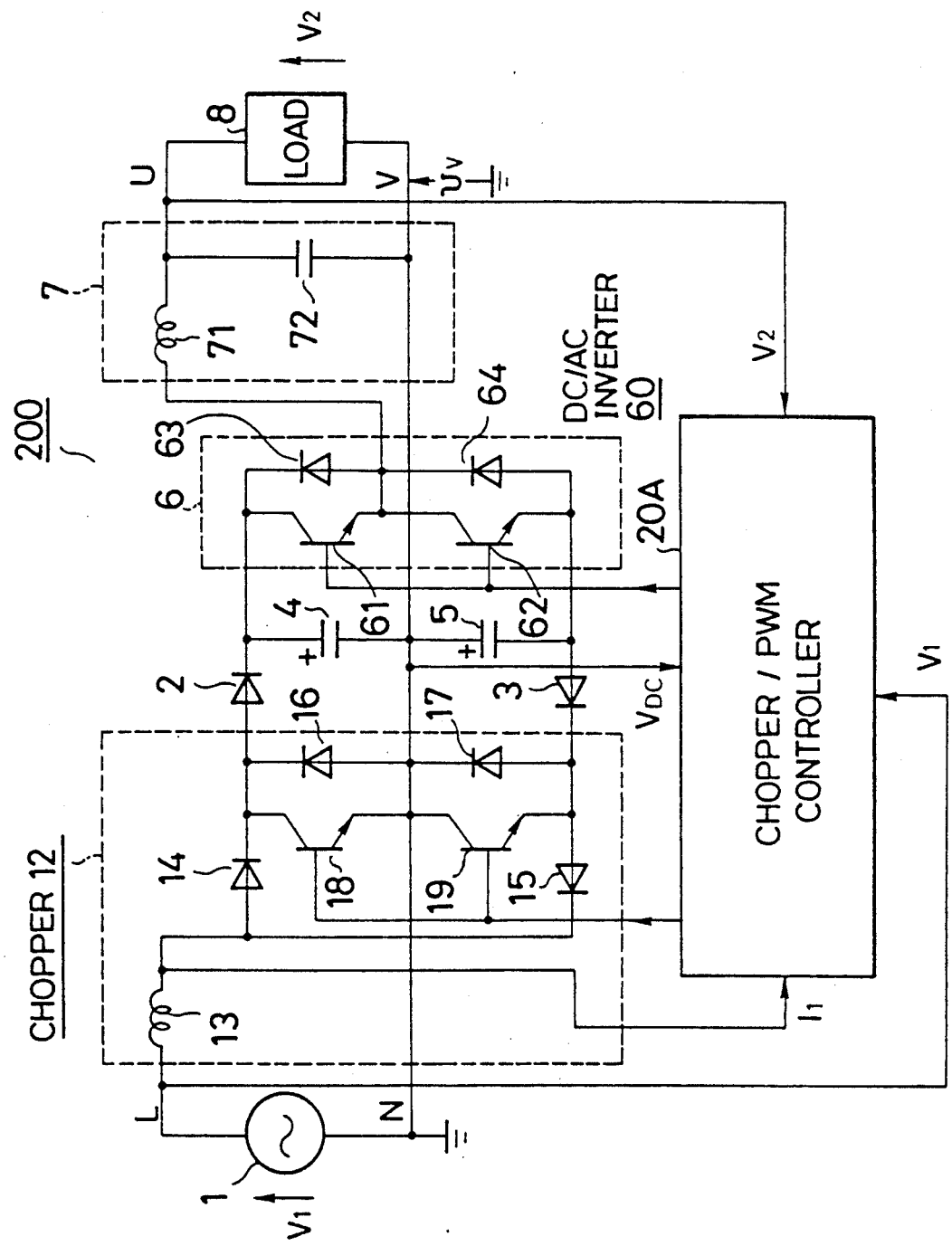
Figure 8:
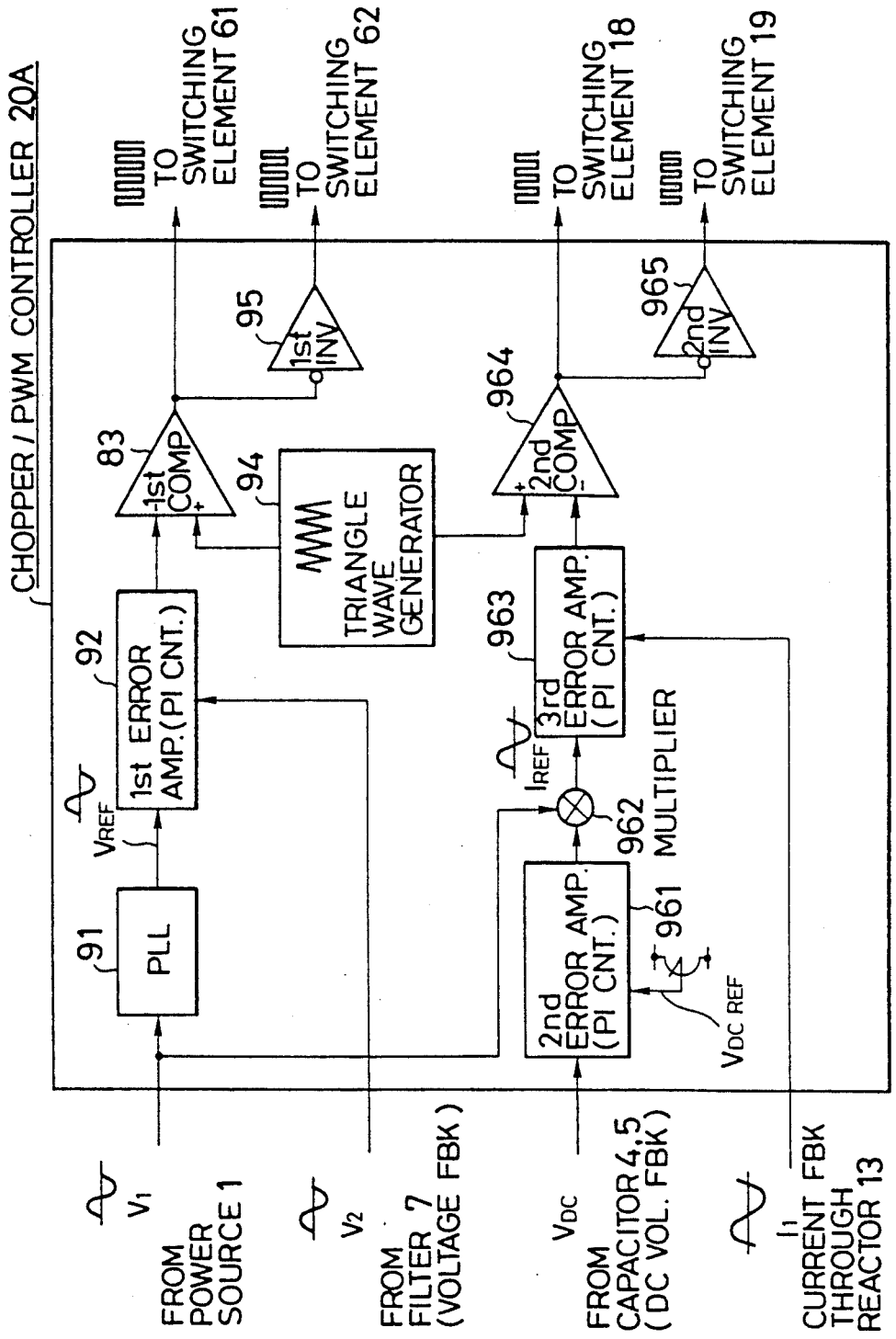
Figure 9:
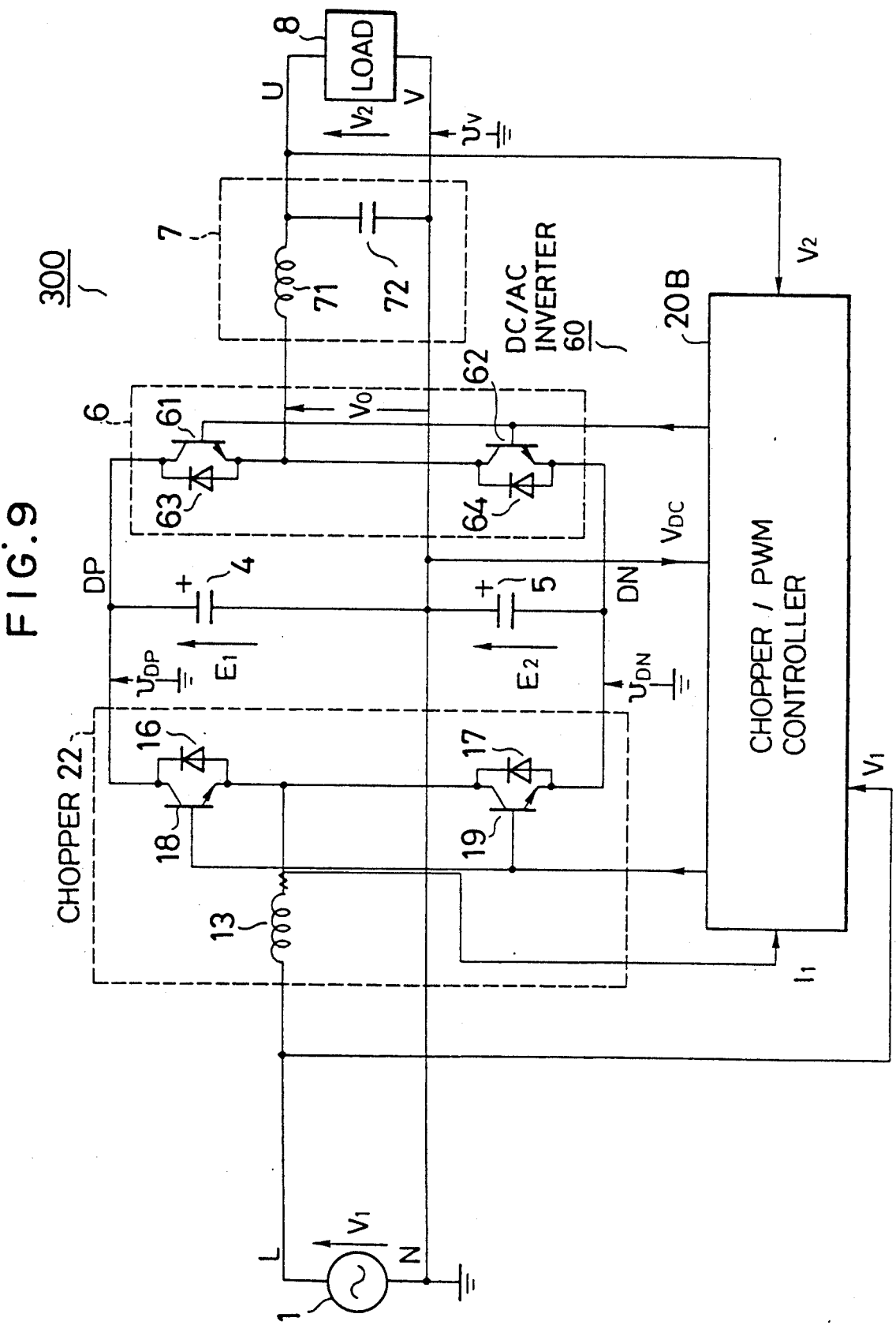
Figure 10:
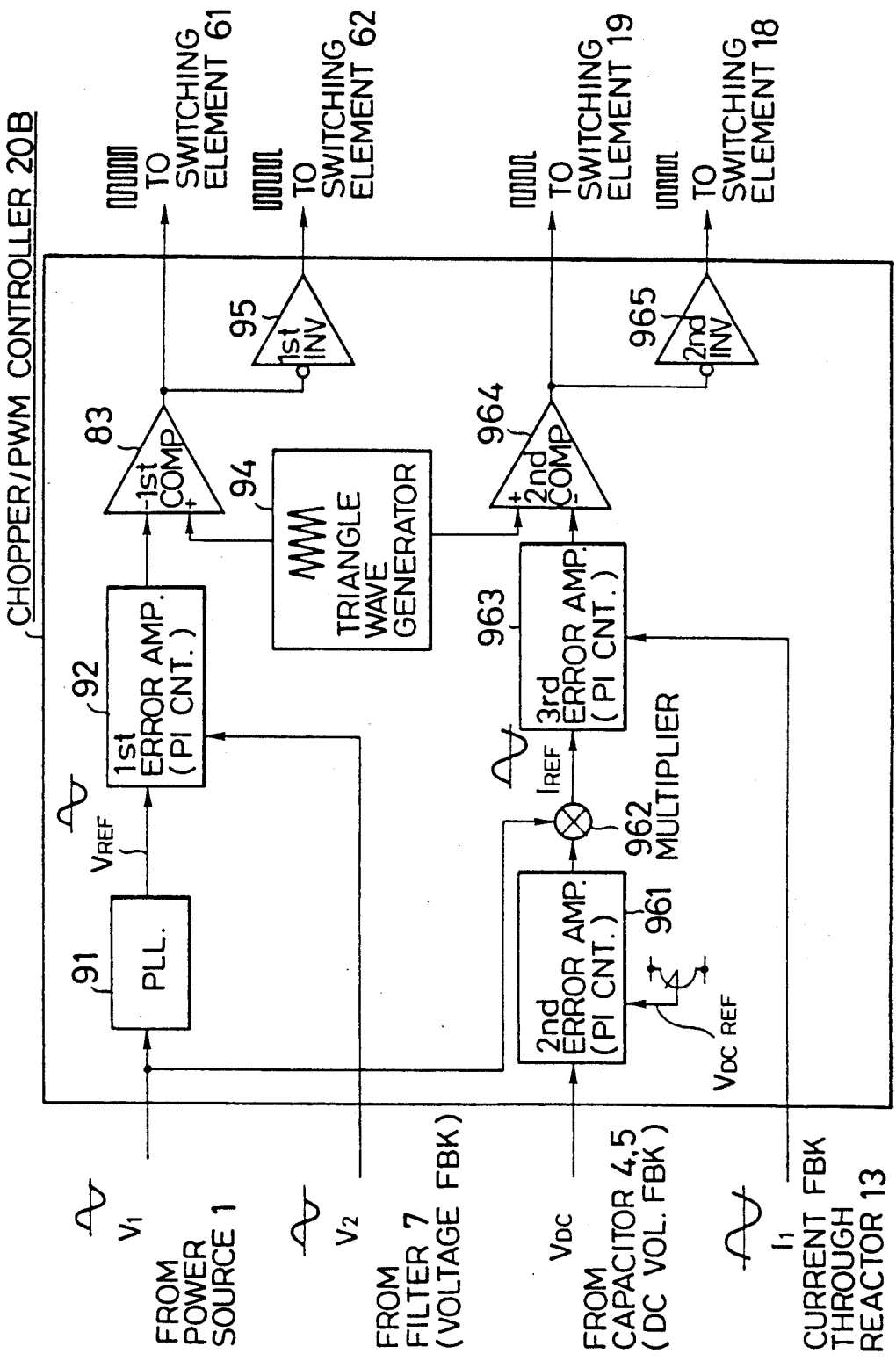
Figure 11:
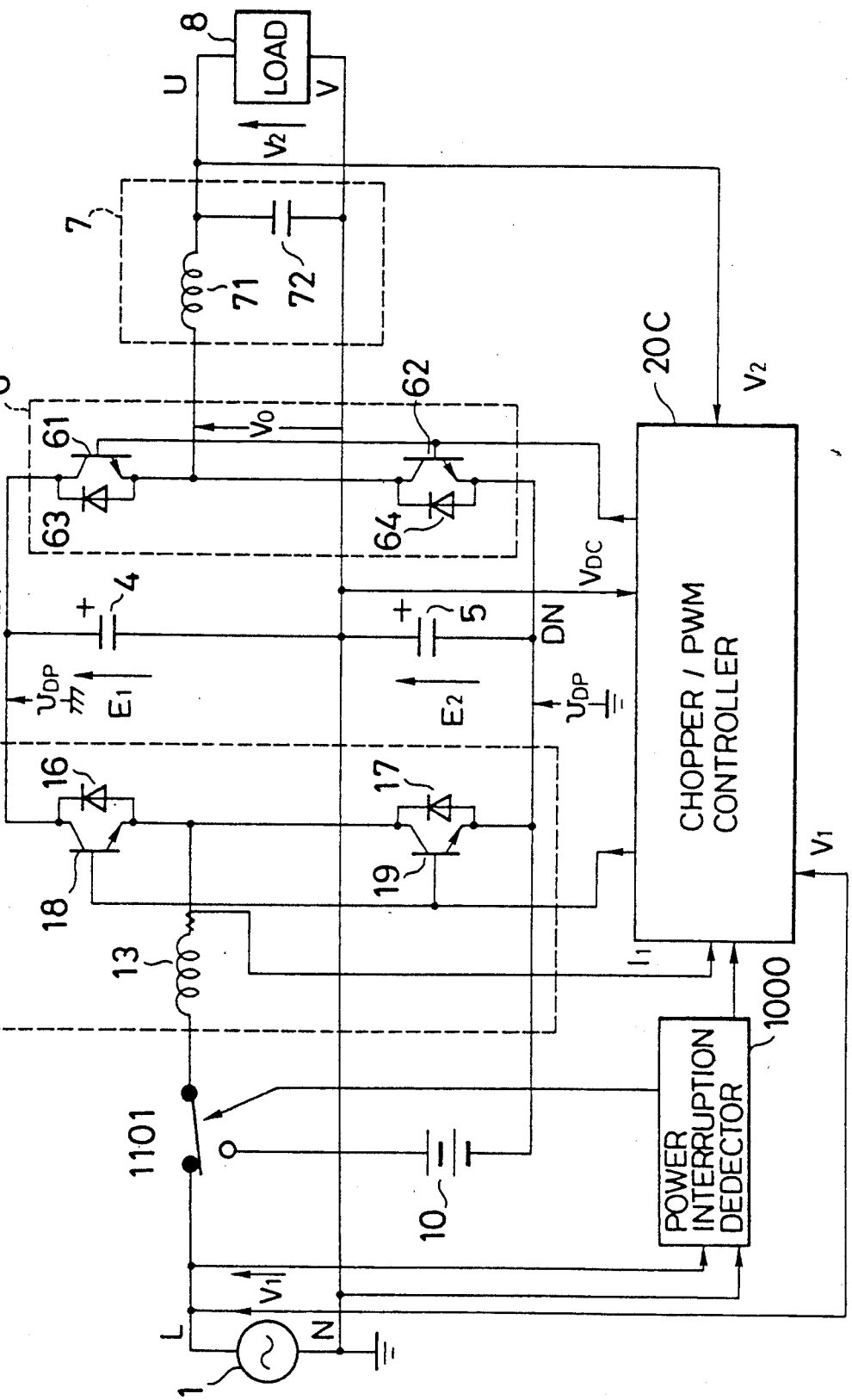

FIG. is a schematic block diagram of a PWM-controlled power supply apparatus 150 operable in an interruptive power source mode;

FIG. 7 is a schematic block diagram of a PWM-controlled power supply apparatus 200 according to a second preferred embodiment;

FIG. 8 is a schematic block diagram of an internal circuit of the chopper/power controller 20A employed in the power supply apparatus 200 shown in FIG. 7;

FIG. 9 is a schematic block diagram of a PWM-controlled power supply apparatus 300 according to a third preferred embodiment;

FIG. 10 is a schematic block diagram of the chopper/PWM controller 20B employed in the power supply apparatus 300 shown in FIG. 9;

FIG. 11 is a schematic block diagram of a PWM-controlled power supply apparatus 400 according to a fourth preferred embodiment; and, FIG. 12 is a schematic block diagram of an internal circuit of the chopper/PWM controller 20C employed in the power supply apparatus 400 shown in FIG. 11.

DETAILED DESCRIPTION OF THE PREFERRED EMBODIMENTS

Circuit Arrangement of First PWM Controlled Power Supply

A PWM-controlled power supply apparatus 100 in the first embodiment of the present invention will be described with reference to FIG. 3.

Figure 1:
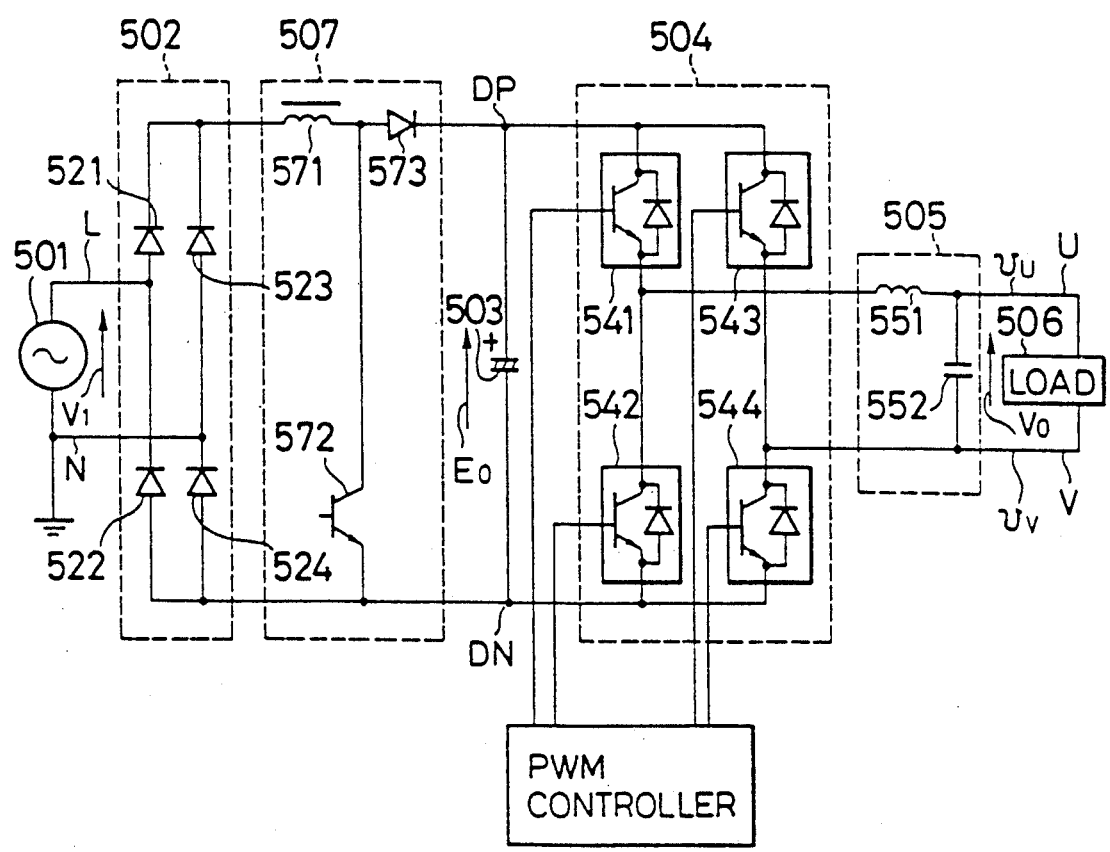
FIG. 1 is a schematic block diagram of the conventional PWM-controlled power supply apparatus.
Figure 2:
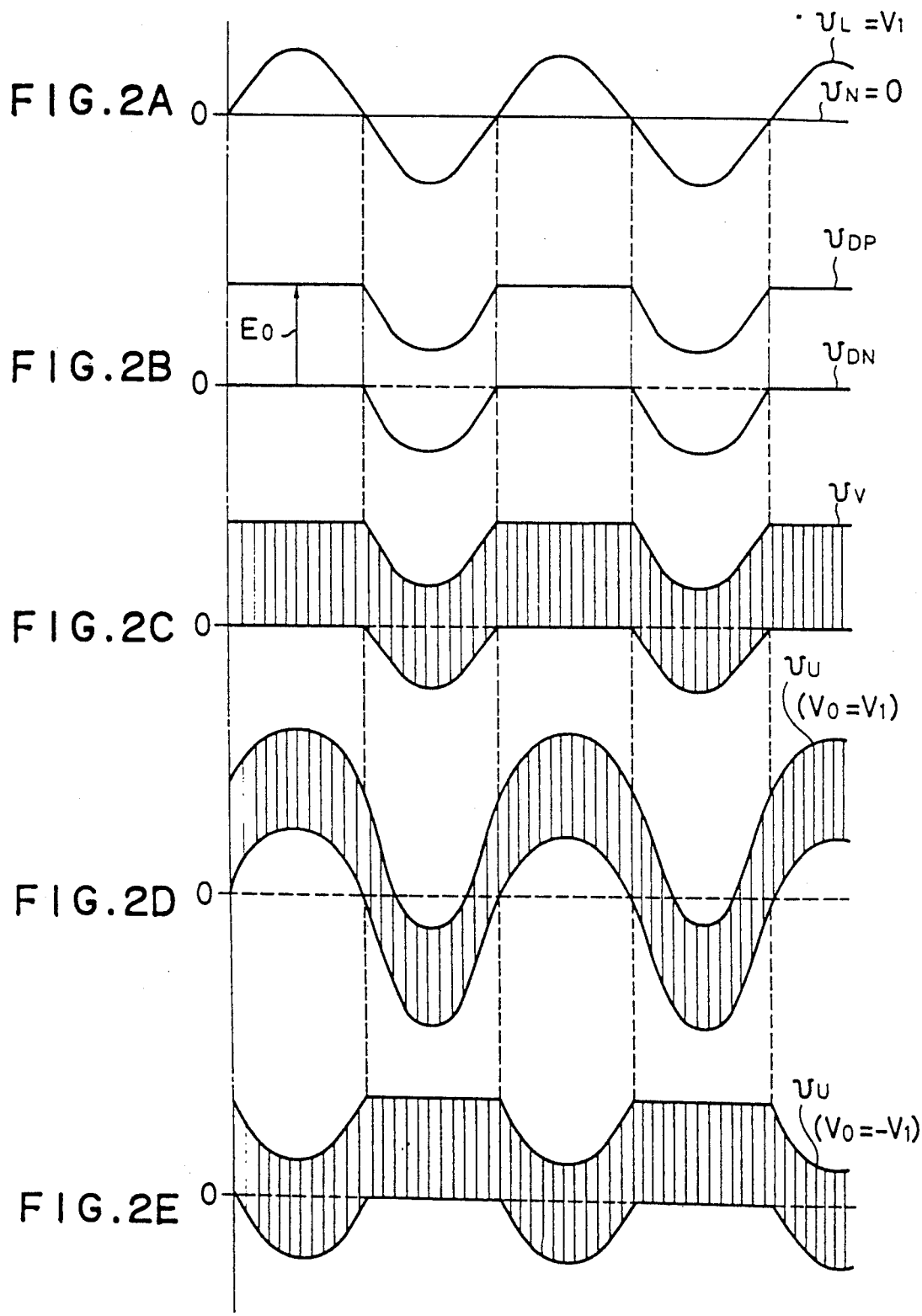
FIGS. 2A to 2E are waveform charts for illustrating high-frequency signal components contained in the ground potentials of the power supply apparatus shown in FIG. 1.
Figure 3:
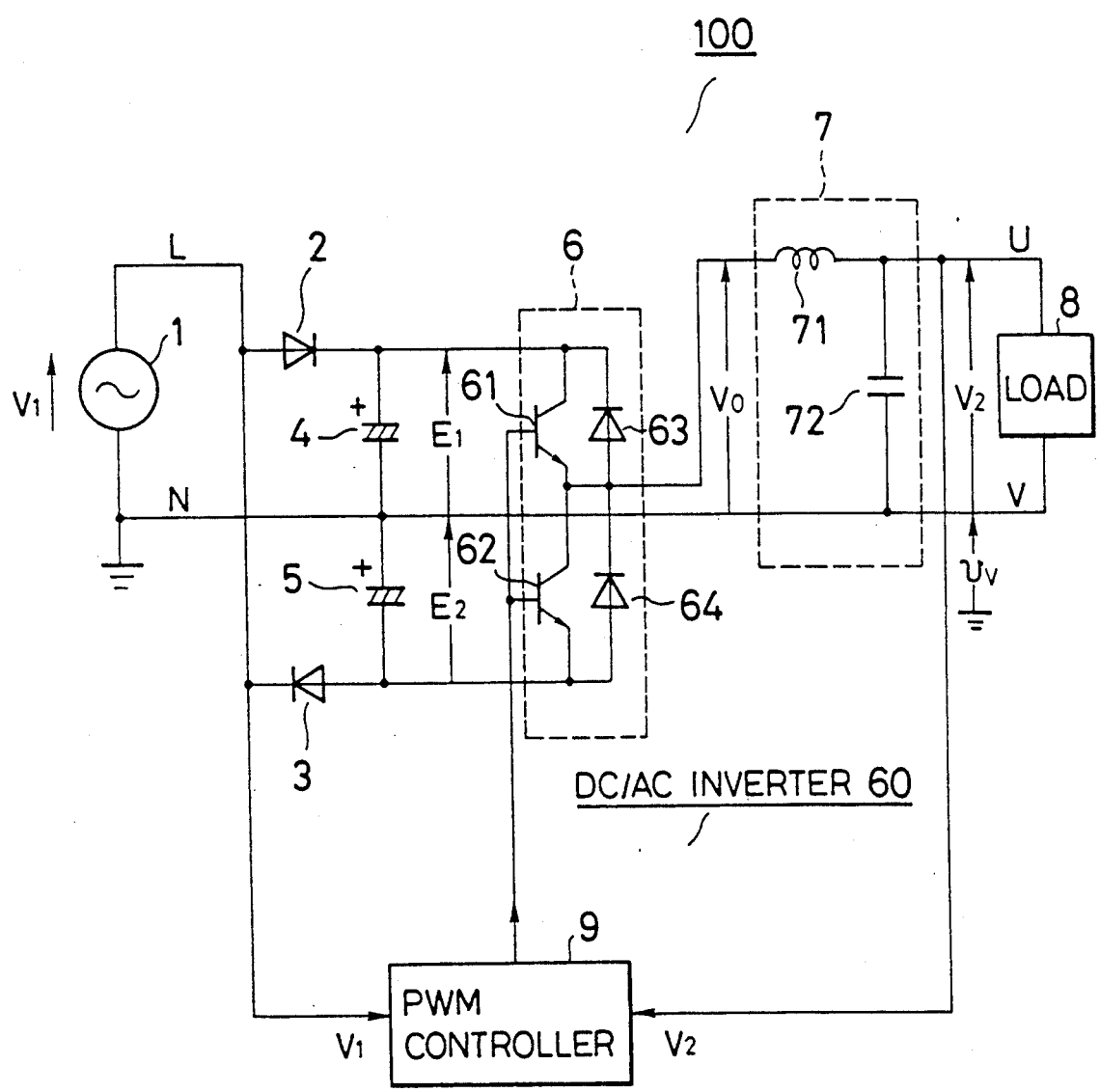
FIG. 3 is a schematic block diagram of a PWM-controlled power supply apparatus 100 according to a preferred embodiment of the invention.

In the power supply apparatus 100 in FIG. 3, reference numerals 2 and 3 denote diodes and 4 and 5 indicate capacitors. An AC power source 1 is applied to a serial connecting point of the diodes 2 and 3 and a serial connecting point of the capacitors 4 and 5, thereby forming a converting circuit. In this case, the line on the side where the AC power source 1 is connected to the ground is connected to the serial connecting point of the capacitors 4 and 5. Reference numeral 6 denotes a switching circuit of an inverter 60. Switching elements 61 and 62 are serially connected. Diodes 63 and 64 are connected in anti-parallel with the switching elements 61 and 62. An output voltage of the inverter is generated between a connecting point of the switching elements 61 and 62 and the connecting point of the capacitors 4 and 5. The output voltage is applied to a load 8 through a filter 7. Reference numeral 9 denotes a PWM controller for PWM controlling the switching circuit 6 of the inverter. The DC/AC inverter 60 comprises the switching circuit 6 and PWM controller 9. An L-type filter comprising an inductance 71 and a capacitor 72 has been shown and used as a filter 7. However, the filter 7 is not limited to such an example of the L-type filter.

PWM Controller

Figure 4:
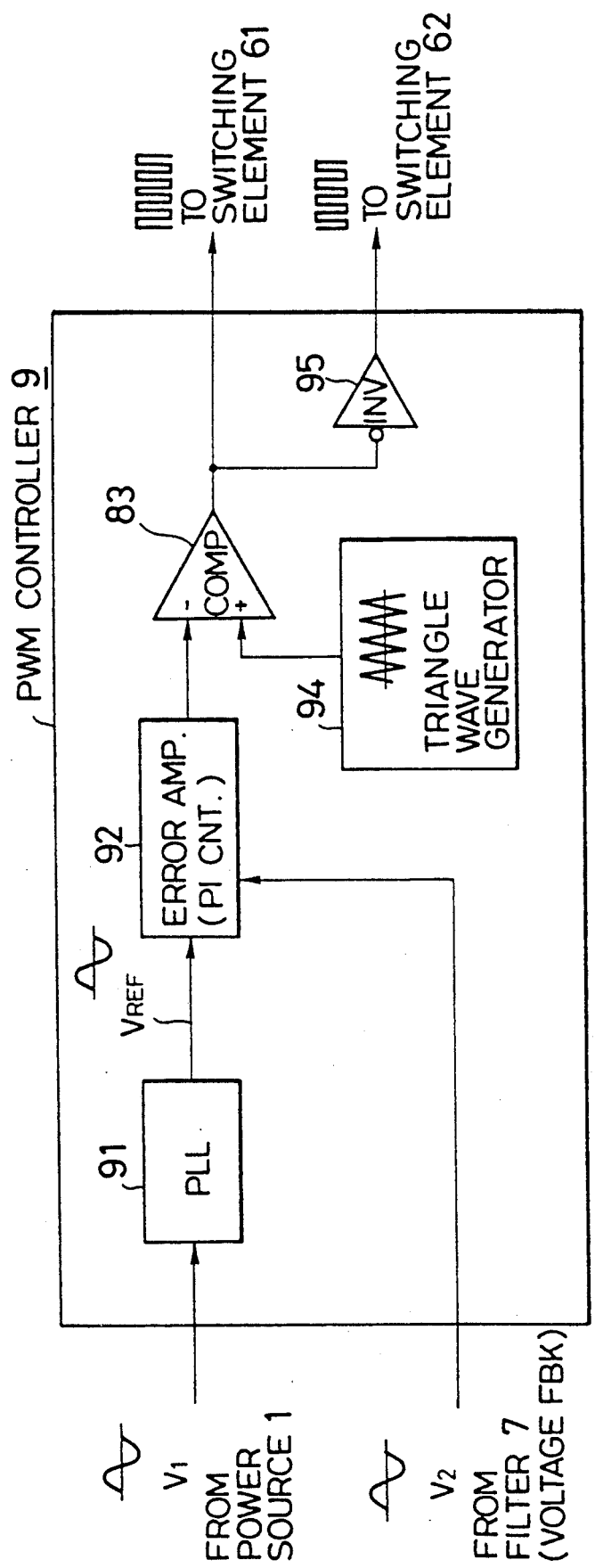
FIG. 4 is a schematic block diagram of an internal circuit of the PWM controller 9 employed in the power supply apparatus 100 shown in FIG. 3.

FIG. 4 is an internal circuit diagram of the PWM controller 9.

First, an AC voltage $V_1$ from the power source 1 is supplied to a PLL (phase locked loop) circuit 91. An output of the PLL circuit 91 and a filtered AC output $V_2$ is proportional integration controlled and its output is supplied to one input terminal (−) of a comparator 83. A triangle wave signal from a triangle wave generator 94 is input to the other input terminal (+) of the comparator 83 and compared. A comparison signal is supplied as a first drive signal to a base electrode of the first switching element 61 of the DC/AC inverter 60. The comparison signal inverted by an inverter 95 is supplied as a second drive signal to a base electrode of the second switching element 62 of the inverter 60.

As will be obvious from FIG. 4, amplitudes of the first and second drive signals to the first and second switching elements 61 and 62 are the same and a phase difference therebetween is set to 180°. Therefore, the first and second switching elements 61 and 62 alternately repeat the ON/OFF operations. In other words, when the first switching element 61 is turned ON, the second switching element 62 is turned OFF.

As described above, since each of the circuit elements is well known, in embodiment, the further detailed description of the operation is not provided.

Switching Operation

Figure 5:
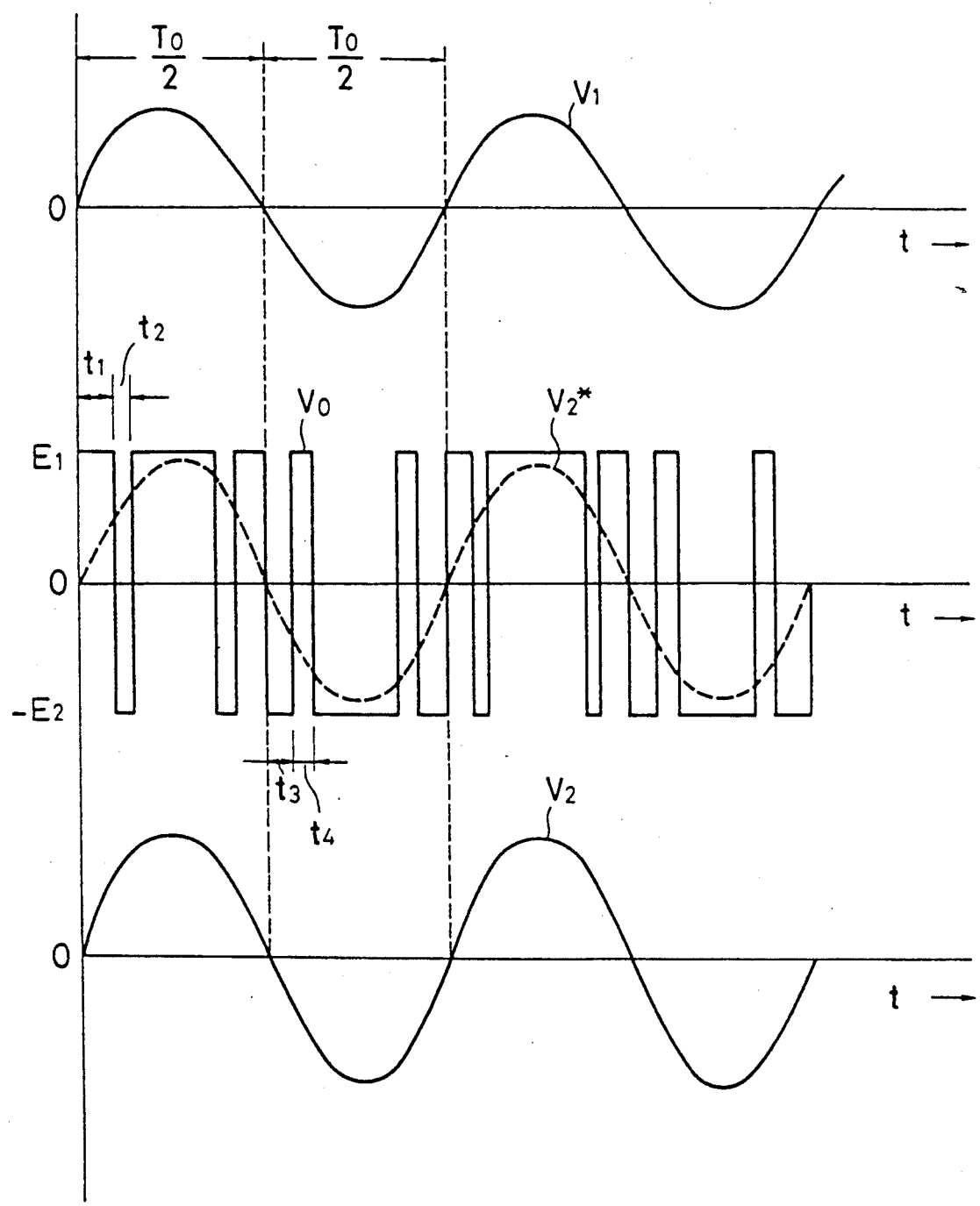
FIG. 5 is a waveform chart for illustrating various ground potentials of the power supply apparatus 100 shown in FIG. 3, from which the high-frequency signal components have been eliminated.

In the above construction, when the voltage $V_1$ of the AC power source 1 has a positive polarity as shown in the diagram, the capacitor 4 is charged to $E_1$ through the diode 2. On the contrary, when $V_1$ has a negative polarity, the capacitor 5 is charged to $E_2$ through the diode 3. Each of the charging voltages $E_1$ and $E_2$ is charged to almost the maximum voltage $\overline{2} V_1$ of the power source voltage $V_1$ and the circuit operates as what is called a double voltage rectifying circuit. With reference to FIG. 5, an explanation will now be made with respect to a state in which those DC voltages are input to the switching circuit 6 of the inverter 60 and are converted into the AC voltages by the PWM control.

The switching elements 61 and 62 of the switching circuit 6 of the inverter 60 repeat the ON/OFF operations by control commands of the PWM controller 9 and a PWM controlled voltage as shown by $V_o$ in FIG. 5 is output. That is, for a half cycle $(T_0/2)$ period when the power source voltage $V_1$ has the positive polarity, the PWM control is executed so that the switching element 61 is turned on and off.

For the positive half cycle period, when the switching element 61 is turned on by only a pulse width $t_1$, the charging voltage $E_1$ stored in the capacitor 4 appears as an output voltage $V_0$. On the other hand, when the switching element 61 is turned off by only a pulse width $t_2$, a load current is refluxed through the diode 64 and the charging voltage $-E_2$ of the capacitor 5 appears as an output voltage $V_0$.

On the other hand, for a negative half cycle period, when the switching element 62 is turned on by only a pulse width $t_3$, the charging voltage $-E_2$ of the capacitor 5 appears as an output voltage $V_0$. When the switching element 62 is turned off by only a pulse width $t_4$, the charging voltage $E_1$ of the capacitor 4 appears as an output voltage $V_0$ due to a reflux current flowing through the diode 63. The switching elements 61 and 62 are made operative so as to keep the opposite ON/OFF logic relation, thereby preventing that the voltage waveform is influenced even if a power factor of the load 8 changes. As mentioned above, the output voltage $V_0$ of the inverter 60 is generated as pulse voltages of the peak values of $E_1$ and $-E_2$ and the PWM control is executed such that their average value is set to a voltage reference $V_2^*$ of a sine wave.

In general, $E_1$ and $E_2$ are equal and the output voltage $V_0$ has positive and negative symmetrical waveforms. The output voltage $V_0$ is transmitted through the filter 7, so that the modulation components of the modulating frequency and the like are eliminated and an output voltage of a smooth sine wave as shown by $V_2$ is obtained.

As will be obvious from the above description, as a feature of the embodiment, the output voltage $V_0$ functions by setting the potential at the connecting point of the capacitors 4 and 5 to the zero potential and the line on the side where the AC power source 1 is connected to the ground is connected to the connecting point of the capacitors 4 and 5, so that a voltage $v_v$ to ground at this point (N or V) becomes zero. Therefore, a voltage to ground at the other output point U is set to $V_2$.

First Non-Interruptive Power Supply

Figure 6:
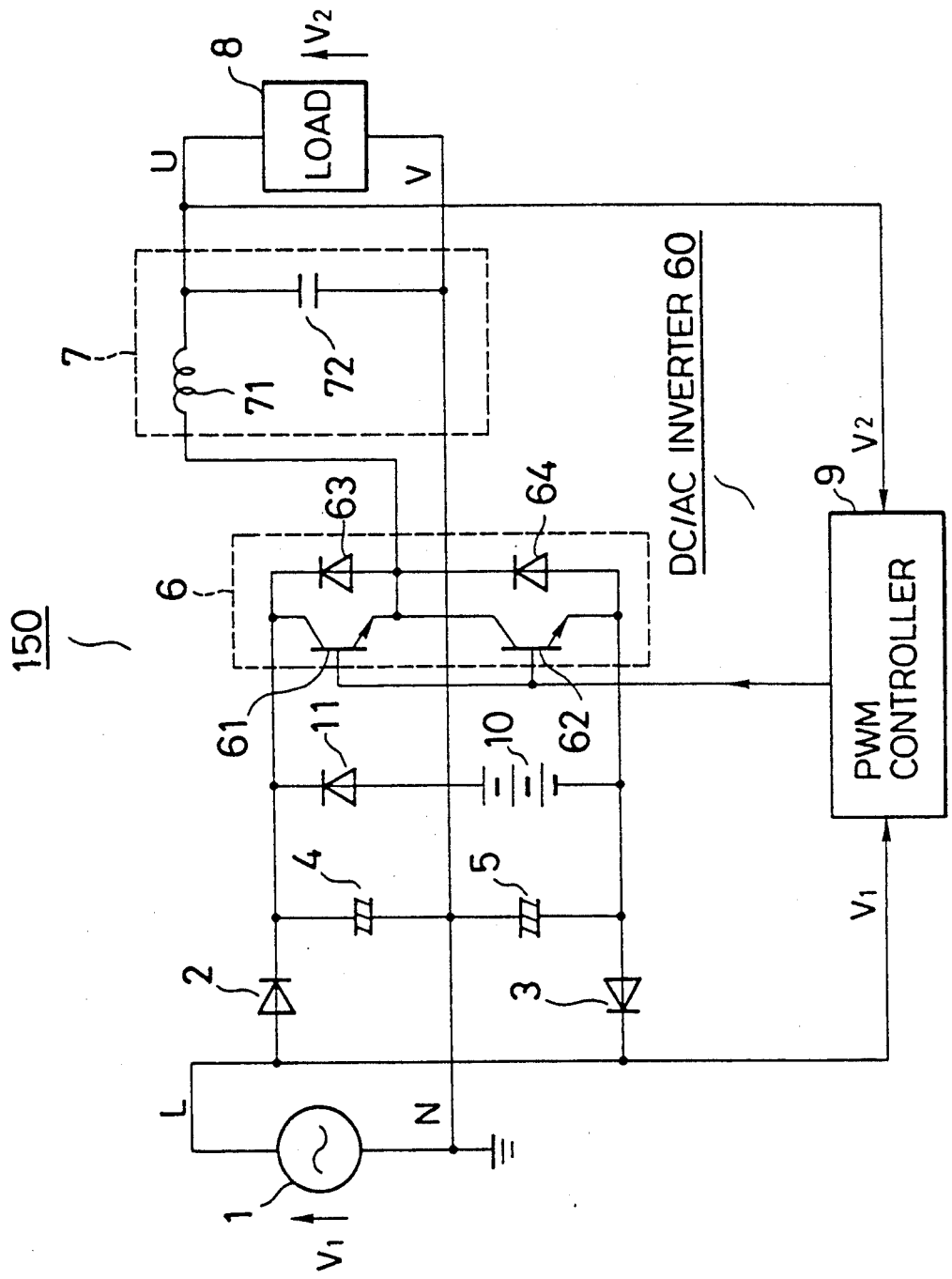

According to the embodiment, as shown in FIG. 6, a series circuit of a battery 10 and a diode 11 is connected in parallel with the series circuit of the capacitors 4 and 5 and a non-interruptive power supply apparatus 150 can be easily constructed.

As desired an AC high output voltage can be easily obtained by providing an auto transformer on the output side of such a power supply apparatus 150. The above construction has an advantage such that the same AC output can be obtained by a small capacitance as compared with the case where a conventional insulative transformer is used in place of the auto transformer.

Since the PWM controller 9 in the embodiment has the same circuit construction as that shown in FIG. 4, its detailed description is omitted.

Second PWM-Controlled Power Supply

FIG. 7 shows a power supply apparatus 200 to which a chopper circuit 12 is added as the second embodiment of the invention.

The chopper circuit 12 comprises a reactor 13, diodes 14 and 17, and switching elements 18 and 19. The switching elements 18 and 19 are ON/OFF controlled by a chopper/PWM controller 20A, which will be explained hereinbelow. That is, for a positive half cycle period of the power source voltage $V_1$, the switching element 18 is ON/OFF controlled by a high frequency of, for instance, 10 to 20 kHz. For a negative half cycle period, the switching element 19 is similarly ON/OFF controlled by a high frequency. When the switching element 18 or 19 is turned on, an energy is accumulated into the reactor 3. When the switching element 18 or 19 is turned off, the capacitor 4 or 5 is charged. The charging voltage can be set to a desired voltage by adjusting the On/OFF times by the chopper/PWM controller 20A, which will be explained hereinafter.

Chopper/PWM Controller

FIG. 8 is an internal circuit constructional diagram of the chopper/PWM controller 20A. As will be obvious from this circuit diagram, since the circuit construction (comparator 83, error amplifier 92, and the like) of the PWM controller is the same as that of the PWM controller 9 in FIG. 4, its description is omitted.

The chopper control function of the chopper/PWM controller 20 will be described. First, DC feedback voltages from the filter capacitors 4 and 5 of the chopper circuit 12 are input to a second error amplifier 961 and compared with a reference DC voltage of $V_{DCREF}$ thereby executing the proportional integration control. An output of the second amplifier 961 is supplied to one input terminal of a multiplier 962 and the power source voltage $V_1$ is also supplied thereto and these inputs are multiplied. A multiplication output of the multiplier 962 is input as $I_{REF}$ to a third error amplifier 963. Further, an output voltage $I_1$ of the reactor 13 is input to the third error amplifier 963, thereby similarly executing the proportional integration control. Its control output is supplied to one input terminal (−) of a second comparator 964 and a triangle wave signal of the triangle wave generator 94 is supplied to the other input terminal (+) and these inputs are compared. A comparison output of the second comparator 964 is supplied to the switching element 18 of the chopper circuit 12. The comparison output of the second comparator 964 is inverted by a second inverter 965 and, thereafter, the inverted signal is supplied to the switching element 19 of the chopper circuit 12, thereby alternately performing the ON/OFF control.

There is a feature such that by controlling the ON/OFF continuation times of the switching elements 18 and 19 of the chopper circuit 12, a DC voltage which is obtained from the chopper circuit 12, that is, an input voltage of the inverter 60 can be set to a desired high voltage.

In the case of the embodiment as well, the voltage $v_v$ to ground at one end (point V) of the output voltage $V_2$ of the inverter becomes zero and the modulation components due to the PWM control are eliminated.

On the other hand, according to the embodiment, a high voltage can be obtained without using a transformer and the apparatus can be miniaturized.

Third PWM-Controlled Power Supply

A third PWM power supply apparatus 300 having a chopper circuit 22 of a circuit construction which is simpler than that of the chopper circuit 12 of the second PWM power supply apparatus 200 will now be described in detail with reference to FIG. 9.

That is, the chopper circuit 22 has a simple construction such that the diodes 2, 3, 14, and 15 are eliminated from the construction of FIG. 7 and the reactor 13 is connected to the serial connecting point of the switching elements 18 and 19.

In the above construction, for the positive half cycle period of the AC power source 1, the switching element 19 is turned on and a current is supplied along the path of the AC power source 1→reactor 13→element 19→capacitor 5→AC power source 1, thereby accumulating energy in the reactor 13. Next, the element 19 is turned off and the energy, accumulated in the reactor 13 is discharged along the path of the reactor 13→diode 16→ capacitor 4→AC power source 1→reactor 13→, thereby charging the capacitor 4. On the other hand, for the negative half cycle period of the AC power source 1, the switching element 18 is ON/OFF controlled by a chopper/PWM controller 20B, thereby similarly charging the capacitor 5. As mentioned above, the current flowing through the reactor 13 is controlled like a sine wave whose phase is the same as that of the AC power source, so that the higher harmonic suppression and high power factor control of the input current can be realized and, at the same time, a DC bus line voltage $(E_1+E_2)$ is controlled to a predetermined voltage $(E_0)$. Since the voltage $v_v$ to ground of the common potential of the capacitors 4 and 5 is equal to 0, voltages $V_{DP}$ and $V_{DN}$ to ground of DC bus lines DP and DN are set as follows.

$$V=E_0/2, V=-E_0/2$$

The switching circuit 6 of the inverter 60 operates in a manner similar to the above and the inverter output voltage obtained through the filter 7 is PWM controlled to the sine wave of a predetermined voltage.

The chopper/PWM controller 20B in this embodiment will now be briefly explained hereinbelow.

FIG. 10 is an internal constructional diagram of the chopper/PWM controller 20B. As will be obvious from the diagram, since the controller 20B is substantially the same as the chopper/PWM controller 20A shown in FIG. 8 in the apparatus 200 in the foregoing embodiment, its detailed description of operation is omitted. A different point will be described hereinbelow. That is, an output from the second comparator 964 is directly supplied to the base electrode of the switching element 19 of the chopper circuit 22. The output of the second comparator 964 is inverted by the second inverter 965 and its inverted output is supplied to the base electrode of the switching element 18 of the chopper circuit 22, thereby controlling the DC output voltage of the chopper circuit 22.

According to the embodiment, the loss due to the diodes is reduced and the highly efficient and economical PWM-controlled power supply apparatus 300 is obtained.

On the other hand, in the construction of the apparatus 300 in this embodiment, by connecting a battery (not shown in detail) to the DC bus line, a non-interruptive power supply apparatus (not shown in detail) can be constructed. In this case, since the battery voltage needs to be made to substantially coincide with the DC bus line voltage, a degree of freedom in selection of the type of the battery is limited.

Fourth PWM-Controlled Power Supply

A fourth PWM-controlled power supply apparatus 400 suitable for a non-interruptive power supply apparatus will now be described with reference to FIG. 11.

In FIG. 11, a change-over switch 1101 is provided to switch the AC power source 1 and the battery 10 in response to a command from a power interruption detector 1000. The positive side of the battery 10 is connected to the switch 1101 and the negative side is connected to the DC bus line DN.

In the above construction, when the AC power source 1 is normal, the switch 1101 switched to the AC power source 1 side. When the AC power source 1 is interrupted, the switch 1101 is switched to the battery 10 side by the command of the power interruption detector 1000. When the switch 1101 is switched to the battery 10, the chopper circuit 22 operates as a voltage booster circuit and a predetermined DC voltage $(E_0)$ is obtained from the voltage of the battery 10. In this case, energy is accumulated in the reactor 13 by turning on the switching element 19. By turning off the switching element 19, a part of the energy accumulated in the reactor 13 is discharged through the diode 16, thereby charging the capacitors 4 and 5.

According to this embodiment, the battery voltage can be DC boosted and a degree of freedom in selection of the kind of the battery is remarkably improved.

Chopper/PWM Controller

FIG. 12 is an internal constructional diagram of a chopper/PWM controller 20C. As will be obvious from the circuit construction of the diagram, since the controller 20C is substantially the same AS THE CHOPPER/PWM controllers 20A (FIG. 8) and 20B (FIG. 10), only the different point will be described hereinbelow.

An output of the second error amplifier 961 in FIG. 12 is input to a first input terminal (2) of a switch 971. A multiplier output of the multiplier 962 is input to a second input terminal (3) of the switch 971. The switching operation of the switch 971 is controlled on the basis of a detection signal of the power interruption detector 1000 in FIG. 11. That is, when the AC power source 1 is normal (in other words, when no power interruption occurs), the detection signal is set to the low level. Due to the L-level signal, the contacts (1) and (3) in the switch 971 are connected and the multiplier output from the multiplier 962 is supplied to the third error amplifier 963. That is, this state is the same operating state as those of the chopper/PWM controllers 20A and 20B in FIGS. 8 and 10.

When a power interruption occurs, the detection signal from the detector 1000 is set to the high level, the contact of the switch 971 is switched, and the contacts (1) and (2) are connected. The DC output from the battery 10 shown in FIG. 11 switches the switch 1101 and is input to the chopper circuit 22 and is input to the second error amplifier 961. Therefore, since the DC input from the battery 10 is supplied to the chopper circuit 22 in place of the input from the AC power source 1, a chopper/PWM control similar to the above is executed.

According to the invention, the potential to ground on the AC output side of the non-insulative type power supply apparatus does not include the modulation components due to the high-speed switching of the PWM control which is harmful to a load of an electronic apparatus such as a computer or the like. The noise filter can be miniaturized or can be also omitted if necessary. On the other hand, since -the modulation components due to the PWM control do not exert any influence on the load side, higher speed switching can be realized. In addition, the potential to ground can be reduced and a safe, reliable PWM-controlled power supply apparatus can be obtained.

On the other hand, the miniaturization, light weight, and high efficiency can be accomplished by the simple construction of the switching circuit.

As necessary, by adding a battery and a simple circuit, a non-interruptive power supply apparatus can be constructed. The invention can be widely applied as a general-purpose power source.

What is claimed is:

1. A power supply apparatus comprising:
   chopper means, coupled to an AC (alternating current) power source capable of supplying a first AC voltage having a low frequency from a pair of output terminals, for chopping said first AC voltage by switching first and second chopper switching elements to obtain a positive DC (direct current) voltage from a positive half cycle of said first AC voltage appearing at one output terminal of said output terminals and a negative DC voltage from a negative half cycle of said first AC voltage appearing at said one output terminal with a common voltage appearing at another output terminal of said output terminals which is a common voltage output terminal; and
   DC-to-AC inverter means including a pair of third and fourth inverter switching elements and a chopper/PWM (pulse width modulation) controller for controlling chopper operations of said first and second chopper switching elements so as to obtain corresponding voltages to said positive and negative DC voltages and also for controlling switching operations of said third and fourth inverter switching elements in a PWM control mode so as to invert said positive and negative DC voltages into a second AC voltage having a modulation frequency higher than said low frequency with respect to said common voltage output terminal, whereby said second AC voltage contains no modulation frequency component.

2. A power supply apparatus as claimed in claim 1, wherein said chopper means further includes a reactor and charging capacitors.

3. A power supply apparatus as claimed in claim 2 wherein said chopper/PWM controller includes:
   a PLL (phase-locked loop) circuit for receiving the first AC voltage to produce a reference voltage:
   an error amplifier for amplifying said second AC voltage based upon said reference voltage in a proportional integration control mode to obtain an error signal;
   a triangle waveform signal generator for generating a triangle waveform signal;
   a comparator for comparing said error signal with said triangle waveform signal to obtain first and second PWM-controlled drive signals;
   means for coupling said first and second PWM-controlled drive signals to drive said first and second switching elements in a PWM control mode; and
   a chopper control circuit for receiving said positive and negative DC voltages and also a feedback current derived from said reactor for switching said first and second chopper switching elements with reference to said triangle waveform signal.

4. An apparatus as in claim 1, wherein said controller is responsive to said first and second AC voltages for controlling said switching operations.

5. An apparatus as in claim 4, wherein said controller performs proportional integration control with respect to said first and second AC voltages for controlling said switching operations.

6. A power supply apparatus as claimed in claim 1, wherein said common voltage output terminal is grounded.

7. A power supply apparatus comprising:
   chopper means, coupled to an AC (alternating current) power source capable of supplying a first AC voltage having a low frequency from a pair of output terminals, for chopping said first AC voltage by switching first and second chopper switching elements coupled across first and second diodes to obtain a positive DC (direct current) voltage from a positive half cycle of said first AC voltage appearing at one output terminal of said output terminals and a negative DC voltage from a negative half cycle of said first AC voltage appearing at said one output terminal with a common voltage appearing at another output terminal of said output terminals which is a common voltage output terminal; and
   DC-to-AC inverter means including a pair of third and fourth inverter switching elements, and a chopper/PWM (pulse width modulation) controller responsive to said first AC voltages for controlling chopper operations of said first and second chopper switching elements so as to obtain corresponding voltages to said positive and negative DC voltages and also for controlling switching operations of said third and fourth inverter switching elements in a PWM control mode so as to invert said positive and negative DC voltages into a second AC voltage having a modulation frequency higher than said low frequency with respect to said common voltage output terminal, whereby said second AC voltage contains no modulation frequency component.

8. An apparatus as in claim 7, wherein said controller is responsive to said first and second AC voltages for controlling said switching operations.

9. An apparatus as in claim 8, wherein said controller performs proportional integration control with respect to said first and second AC voltages for controlling said switching operations.

10. A power supply apparatus as claimed in claim 7, wherein said common voltage output terminal is grounded.

11. A power supply apparatus as claimed in claim 7, wherein said chopper means further includes a reactor and charging capacitors.

12. A power supply apparatus as claimed in claim 11, wherein said chopper/PWM controller includes:
- a PLL (phase-locked loop) circuit for receiving said first AC voltage to produce a reference voltage:
- an error amplifier for amplifying said second AC voltage based upon said reference voltage in a proportional integration control mode to obtain an error signal;
- a triangle wavelength signal generator for generating a triangle waveform signal;
- a comparator for comparing said error signal with said triangle waveform signal to obtain first and second PWM-controlled drive signals;
- means for coupling said first and second PWM-controlled drive signals to drive said first and second switching elements in a PWM control mode; and
- a chopper control circuit for receiving said positive and negative DC voltages and also a feedback current derived from said reactor for switching said first and second chopper switching elements coupled across said first and second diodes with reference to said triangle waveform signal.

13. A power supply apparatus as claimed in claim 11, further comprising:
- power switch means interposed between said AC power source and said chopper means;
- a battery connected to one input terminal of said power switch means; and,
- a power interruption detector, connected to said AC power source, for producing a power interruption signal when said AC power source has failed and for exclusively selecting an input voltage of said power switch means in response to said interruption signal, whereby a DC voltage derived from said battery is applied to said chopper means while said power interruption signal is produced from said power interruption detector.

14. A power supply apparatus as claimed in claim 13, wherein said chopper/PWM controller includes:
- a PLL (phase-locked loop) circuit for receiving said first AC voltage to produce a reference voltage:
- an error amplifier for amplifying said second AC voltage based upon said reference voltage in a proportional integration control mode to obtain an error signal;
- a triangle waveform signal generator for generating a triangle waveform signal;
- a comparator for comparing said error signal with said triangle waveform signal to obtain first and second PWM-controlled drive signals;
- means for coupling said first and second PWM-controlled drive signals to drive said first and second switching elements in a PWM control mode; and
- a chopper control circuit, having a second power switch, for receiving said positive and negative DC voltages and also a feedback current derived from said reactor to switch said first and second chopper switching elements coupled across said first and second diodes with reference to said triangle waveform signal, said second power switch being controlled in response to said power interruption signal so as to select said input voltage of said power switch means.

* * * * *